United States Patent [19]

Newbold et al.

[11] Patent Number: 5,259,542
[45] Date of Patent: Nov. 9, 1993

[54] ANTI-SWAY DEVICE FOR A BICYCLE CARRIER

[75] Inventors: Dixon Newbold, Glocester; Joseph E. Newman, Providence, both of R.I.

[73] Assignee: Bell Sports Corporation, Rantoul, Ill.

[21] Appl. No.: 736,110

[22] Filed: Jul. 26, 1991

[51] Int. Cl.⁵ .................................................. B60R 9/00
[52] U.S. Cl. ............................... 224/324; 224/42.03 B
[58] Field of Search ............... 224/324, 42.03 B, 321, 224/314, 329; 211/17, 22

[56] References Cited

U.S. PATENT DOCUMENTS 2,512,267  6/1950  Donnelley ................ 224/42.03 B
4,830,250  5/1989  Newbold et al. ............... 224/314

OTHER PUBLICATIONS

Blackburn Fastrak Advertisement (1991 or prior) only information available.

Barrecrafters Unisport System, Spoke-Tote, p. 7 (1991) only information available.

Primary Examiner—Linda J. Sholl
Attorney, Agent, or Firm—Wolf, Greenfield & Sacks

[57] ABSTRACT

A locking member for releasably securing a bicycle to a carrier on a motor vehicle. The locking member can be quickly and easily slid onto a support arm of the carrier, adjustably positioned along the length of the support arm, and releasably secured to the arm by a simple rotational movement of an eccentric locking sleeve. The device includes an upper channel surface, surrounding the locking sleeve, on which the top tube of the bicycle frame rests and a second rigid pivotal member with a releasable strap engaging either the seat or down tube of the bicycle frame. The pivotal attachment of the first and second rigid members allows virtually any angular relationship between the members so as to securely engage the respective tubes of the bicycle frame.

14 Claims, 4 Drawing Sheets

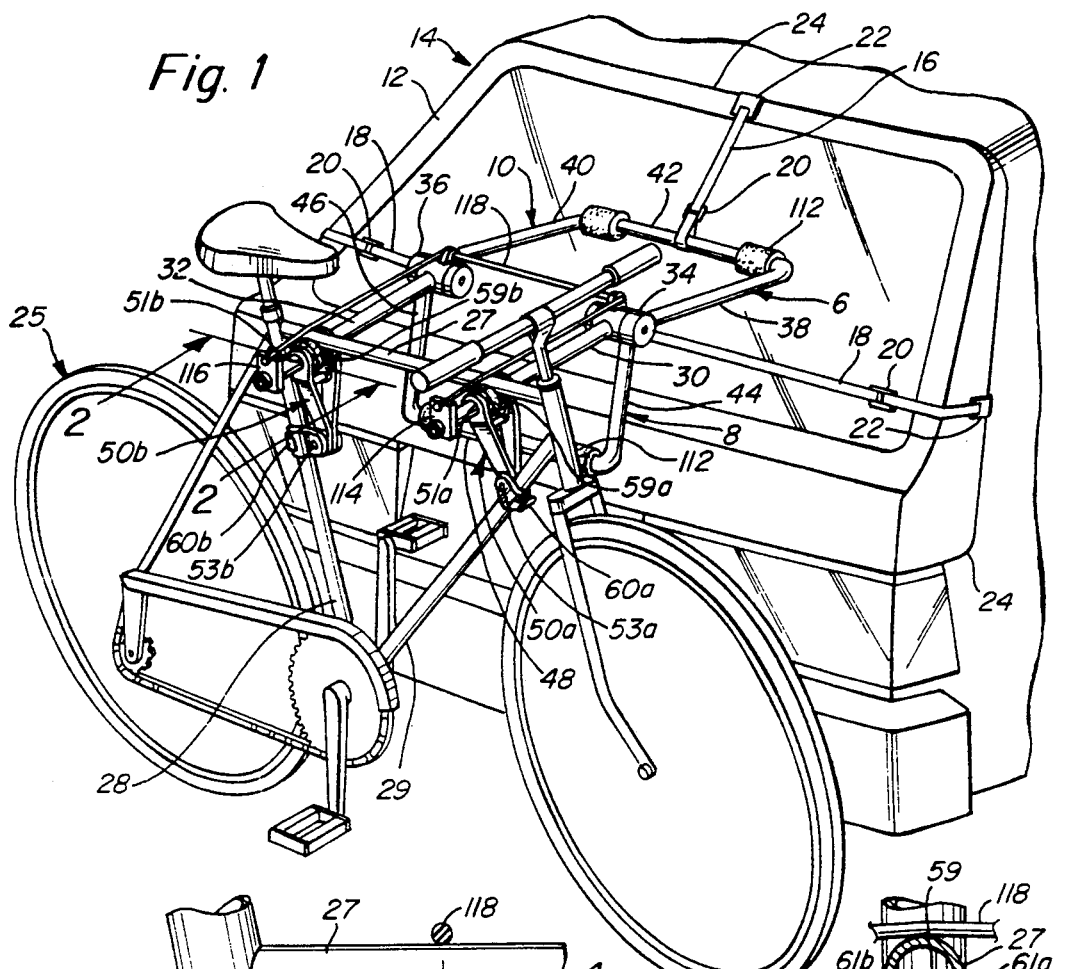
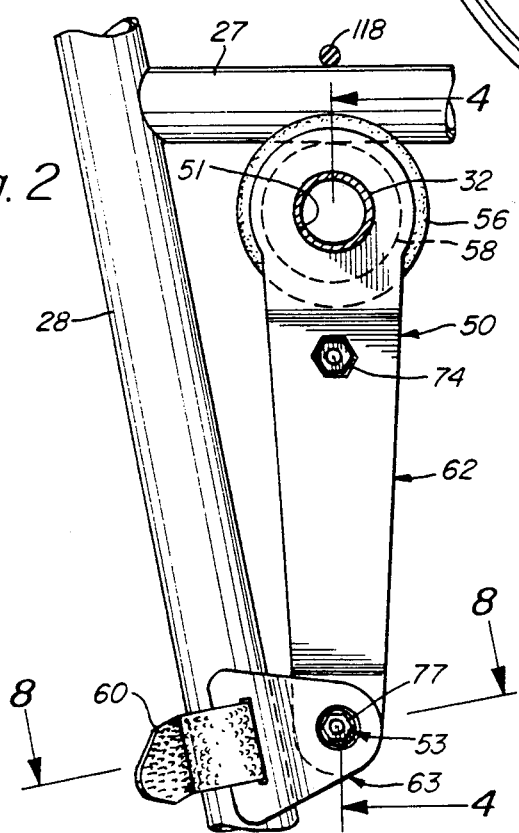
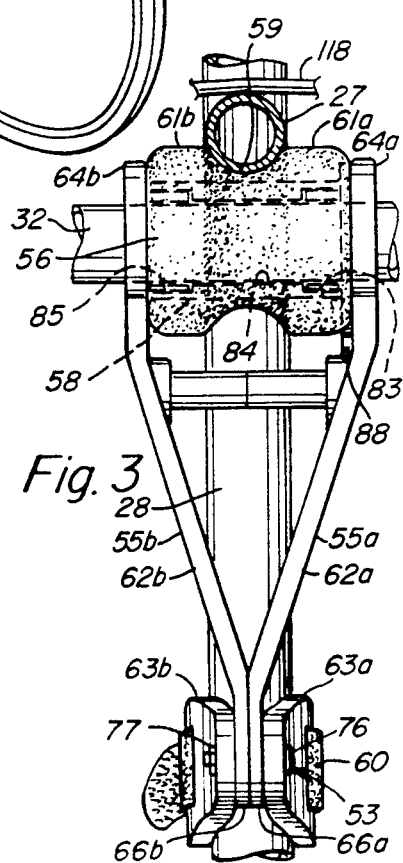
Fig. 1
Fig. 2
Fig. 3

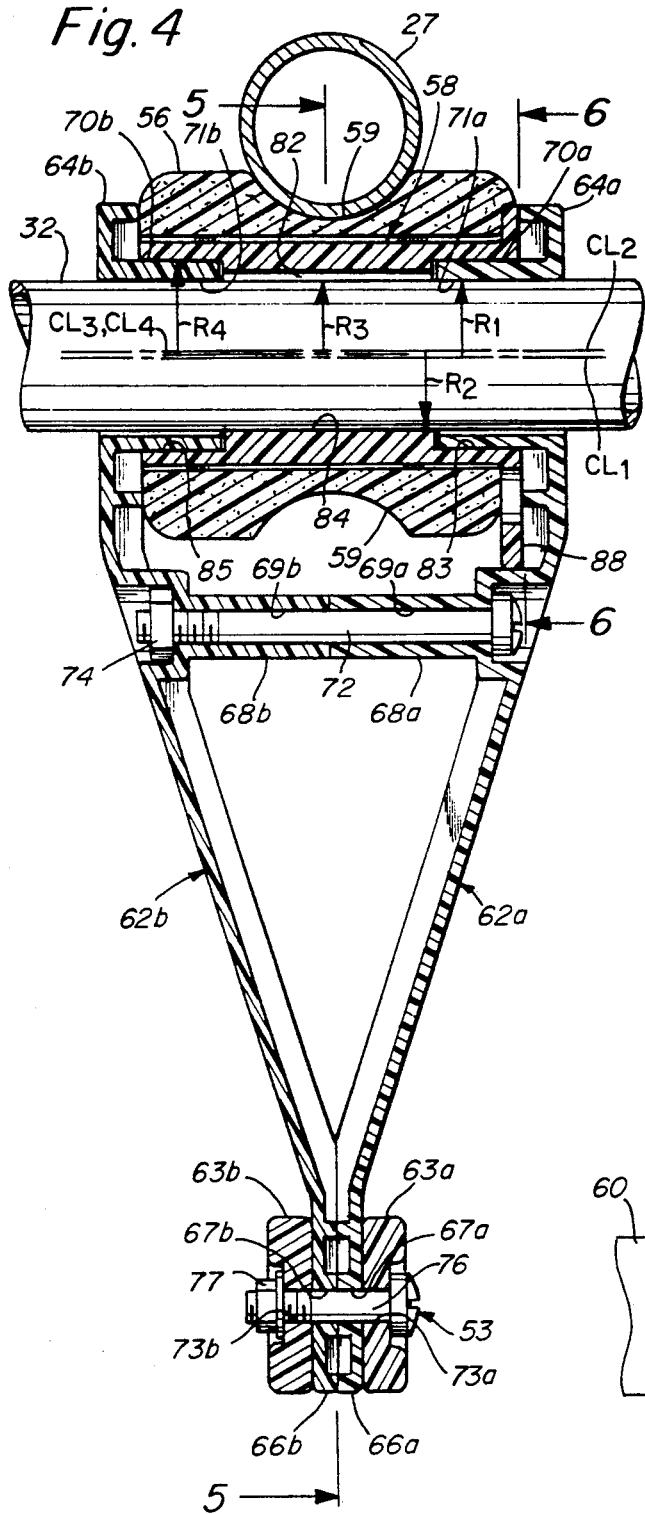
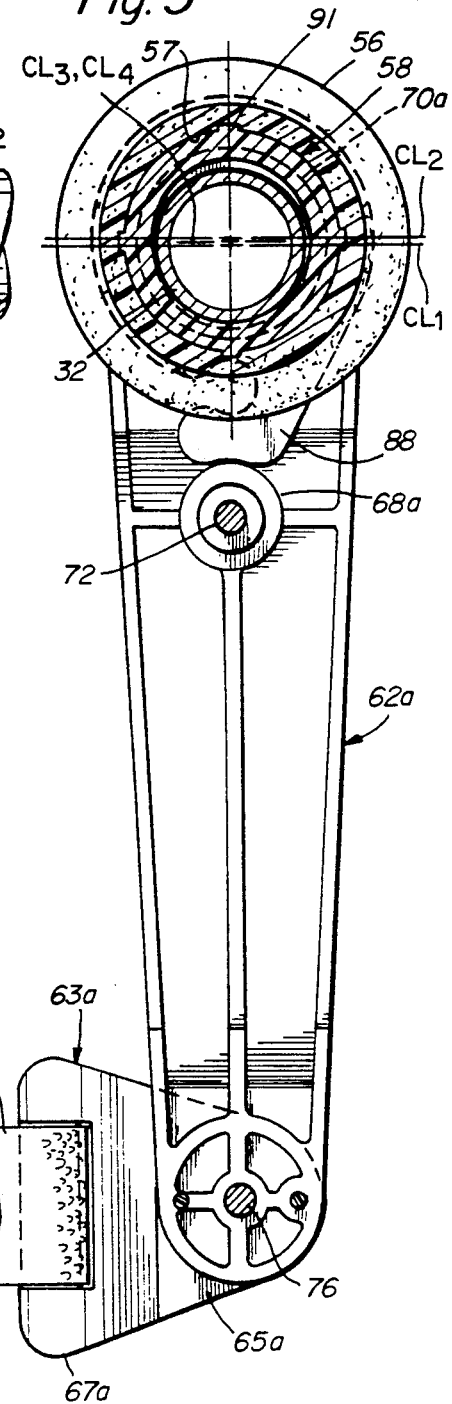

ANTI-SWAY DEVICE FOR A BICYCLE CARRIER

FIELD OF THE INVENTION

This invention relates to carriers which are attached to the outside of a motor vehicle for carrying a bicycle or other object, and more particularly to an anti-sway locking device for a carrier which prevents the bicycle from banging against the car or other bicycles on the carrier.

BACKGROUND OF THE INVENTION

Many carriers have been designed for transporting a bicycle on the back of a motor vehicle. For example, U.S. Pat. No. 4,830,250, issued May 16, 1989 to Newbold et al., describes an adjustable carrier having a pair of U-shaped frame members and a pair of straight support arms, each of which can be adjusted to virtually any angle so as to fit virtually any vehicle. The top tube of the bicycle frame rests on top of the pair of support arms, between a pair of spacer brackets which position the bicycle along the support arm, and beneath an elastic tie cord. The brackets and tie cord together hold the bicycle to the carrier. While the spacer brackets can be moved along the support arms to adjust their position, such adjustment requires the use of a screwdriver which may be inconvenient. Also, the manner in which the brackets engage the top tube of the bicycle frame may not prevent the bicycle from swaying on the carrier and thus knocking against other bicycles on the carrier or the vehicle itself.

SUMMARY OF THE INVENTION

It is an object of the present invention to provide an anti-sway locking device for a bicycle carrier which more securely holds the bicycle to the carrier and prevents it from swinging into contact with other bicycles on the carrier or the motor vehicle.

Another object of the invention is to provide a device which can be easily attached to the support arms of any standard carrier.

Still another object is to provide an attachment which can be easily moved along the support arms to adjust its position without requiring the use of tools.

Yet another object is to provide an attachment which permits a bicycle to be mounted and dismounted quickly and easily from the attachment.

According to the invention, a locking member for releasably securing a bicycle to a carrier is provided. The locking member includes a first rigid member having a locking sleeve on one end with a central bore adapted to slidably engage the support arm on a bicycle carrier. The sleeve is easily slid onto the support arm during installation and can be moved along the support arm to vary its position. The sleeve can also be releasably and securably locked to the support arm at any position. The sleeve is preferably locked to the support arm by means of a rotatable eccentric. The sleeve further includes a channel on its outer surface for supporting the top tube of the bicycle frame, and preferably the channel is provided in a foam cushion disposed around the sleeve. The other end of the first rigid member is pivotally connected to a second rigid member. The second member is shaped at its other end to at least partially surround the seat tube or down tube of the bicycle frame, and is secured thereto by a releasable strap. The ability to adjust the angular relationship between the first and second rigid members at the pivot point enables the first member to engage the support arm and top tube while the second member engages either the seat tube or down tube in order to hold the bicycle securely in position on the carrier.

BRIEF DESCRIPTION OF THE DRAWINGS

FIG. 1 is a perspective view showing the carrier secured to the rear of a hatchback type of motor vehicle and with a bicycle mounted thereon.

FIG. 2 is a partial cross-sectional view taken along the section lines 2—2 of FIG. 1, showing the locking member of this invention supporting the bicycle frame on the carrier.

FIG. 3 is a partial cross-sectional view similar to FIG. 2 but showing a front view of the locking member.

FIG. 4 is a sectional view similar to FIG. 3 showing various centerlines of the eccentric locking member.

FIG. 5 is a sectional view taken along the section lines 5—5 of FIG. 4.

DETAILED DESCRIPTION OF THE PREFERRED EMBODIMENTS

Figure 6:
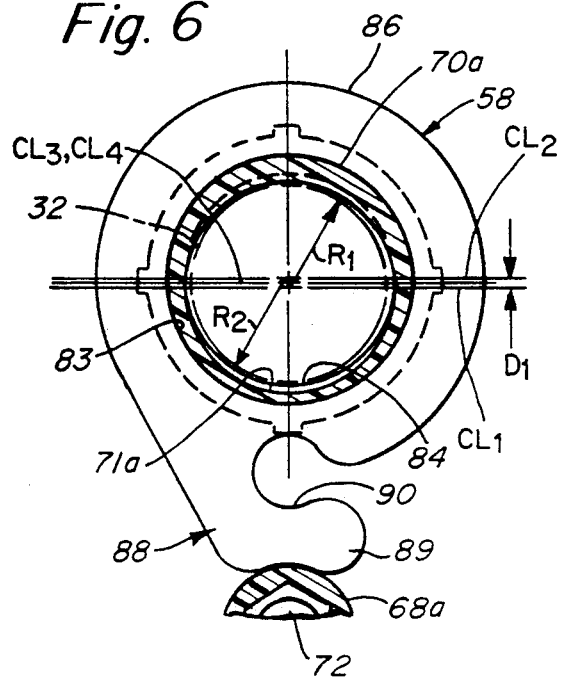
FIG. 6 is a partial sectional view showing the locking sleeve in the locked position.

FIG. 1 illustrates a standard bicycle carrier 10 on which the anti-sway device 50 of this invention may be mounted. The carrier frame does not form a part of this invention and any standard carrier may be used. The carrier described herein is that disclosed in U.S. Pat. No. 4,830,250 which is hereby incorporated by reference in its entirety.

The carrier 10 is secured to the hatchback lid 12 of an automobile 14. Upper strap 16 and side straps 18 are attached to and extend from the carrier 10 to secure it to the hatchback lid 12. The straps 16, 18 include buckles 20 for adjusting the length of the straps 16, 18 and the straps terminate with attachment brackets 22, which brackets 22 are adapted to grip the outer edge 24 of a hatchback or trunk lid. A bicycle 25 is supported by the carrier 10.

The carrier 10 has two U-shaped frame members 6, 8 and two straight support arms 30, 32. The frame members 6, 8 and support arms 30, 32 are connected at and radiate from two hub assemblies 34, 36. The hub assemblies 34, 36 define an axis about which the frame members 6, 8 and support arms 30, 32 may rotate independently.

The larger outer frame member 6 defines two legs of equal length, a first leg 38 and a second leg 40, joined at their outer ends by a first crossbar 42. The smaller inner frame member 8 also defines two legs of equal length, a first leg 44 and second leg 46, joined at their outer ends by a second crossbar 48. When not in use, the frame may be collapsed for storage wherein the smaller inner frame member 8 may be aligned to fit within the space defined by the outer frame member 6. During use, the inner and outer frame members and support arms may be rotated independently about the hubs 34, 36 to virtually any angular relationship so as to fit any motor vehicle and securely support one or more bicycles thereon.

Pads 112 are disposed on the crossbars 42, 48 so that the carrier does not scratch the surface of the motor vehicle to which it is secured.

The releasable locking and anti-sway device 50 of this invention is attached to a support arm on the carrier, and preferably one of devices 50 is attached to each of the support arms 30, 32. As shown in FIG. 1, device 50a has an upper bore 51a for sliding the device onto the right support arm 30; releasable end cap 114 is then placed on the distal end of support arm 30. Similarly, device 50b has a bore 51b which allows it to be slid onto left support arm 32 and end cap 116 positioned at a distal end of support arm 32. The devices 50a and 50b are releasably locked into position on the support arms as described hereinafter.

A bicycle 25 having a triangular frame formed by top tube 27, down tube 29 and seat tube 28, is mounted on the carrier with top tube 27 lying within channels 59a and 59b provided on the upper ends of devices 50a and 50b. The lower strap 60a on device 50a engages down tube 29, while the lower strap 60b on device 50b engages the seat tube 28. Each device 50a, 50b has a pivot point 53a, 53b which allows the angular relationship between the upper and lower support arms of the device to be varied to quickly and securely engage the top tube and either the down or seat tube of the bicycle. The secure attachment of the devices 50a, 50b to the bicycle frame and the rigid structure of the devices locks the bicycle into position so that it will not sway or knock against other bicycles on the carrier or the car. While the use of two devices 50a and 50b is shown herein as a preferred embodiment providing the most secure attachment of the bicycle to the carrier, it should be understood that a single device 50 can be used alone to secure a bicycle to the carrier, mounted on either left or right support arms 30, 32. If a single device 50 is used, preferably it is provided on support arm 32 so that it engages top tube 27 and seat tube 28.

An elastic tie cord 118 may further be provided to secure the top tube to the sleeve. The cord has a first end positioned at right end cap 114, and extends along right support arm 30 to right hub 34, across crossbar 42, left hub 33, and left support arm 32, to end cap 116. The cord may be releasably attached to end caps 114, 116 and hubs 34, 36.

As shown in FIGS. 2-5 and 9, the locking device 50b includes an upper rigid member 62 including arms 62a, 62b, a lower rigid member 63 including arms 63a, 63b, a foam cushion 56 provided over a locking sleeve 58, and a strap 60.

The first rigid member 62 consists of a pair of substantially mirror-image arms 62a, 62b (FIGS. 3-5), having a pair of spaced apart upper ends 64a, 64b and a pair of adjacent lower ends 66a, 66b, connected by outwardly diverging midportions 55a, 55b. A screw 72 (FIG. 4) is positioned through bores 69a and 69b in screw covers or projections 68a and 68b extending between the arms 62a, 62b for joining the same; a nut 74 is provided at the distal end of the screw 72. The lower ends 66a, 66b of the arms are pivotally attached via a screw 76 and nut 77 to a pair of lower rigid members 63 as described hereinafter.

At the upper ends 64a, 64b of arms 62a, 62b, a locking sleeve 58 is provided therebetween. Cylindrical end caps or hubs 70a, 70b having bores 71a, 71b project inwardly from each of the arms for engaging opposite ends of the locking sleeve. The locking sleeve 58 is a cylindrical member having an inner bore 82 and serves as an eccentric member which can be rotated into secure engagement with one of the support arms 30, 32 on the carrier, and similarly released therefrom by simply rotating the sleeve.

The following parameters are used to describe the operation of the releasable locking sleeve shown in FIGS. 4-7:

CL1 = centerline of bores 71a, 71b in hubs 70a, 70b of arms 62a, 62b

R1 = radius of bores 71a, 71b in hubs 70a, 70b of arms 62a, 62b

CL2 = centerline of outer bore portions 83, 85 of locking sleeve 58

R2 = radius of outer bore portions 83, 85 in locking sleeve 58

CL3 = centerline of carrier support arm 32

R3 = radius of carrier support arm 32

CL4 = centerline of eccentric outer diameter of hubs 70a, 70b on arms 62a, 62b

R4 = radius of outer eccentric hubs 70a, 70b on arms 62a, 62b

D1 = distance between CL1 and CL2 when locking sleeve is fully engaged or locked D2 = distance between CL1 and CL4, representing the difference in centerline of the hub 70a (or 70b) from top to bottom (or 180°).

The locking sleeve 58 includes a reduced diameter central bore portion 84 (FIG. 4) and larger diameter outer bore portions 83, 85 at opposing ends. The outer bore portions 83, 85 rotatably engage the outer diameters of hubs 70a, 70b respectively of the support arms 62a, 62b. The central bore portion 84 of the locking sleeve engages carrier support arm 32 when the sleeve is locked onto the carrier as shown in FIGS. 4-6. A 180° rotation of sleeve 58 changes the relationship of locking sleeve 58 and carrier arm 32 from fully locked to fully unlocked. Furthermore, the locking sleeve has an extending peripheral flange 86 at one end to indicate whether the sleeve is locked or unlocked. The flange includes a hook-shaped detent or locking tab 88 defined by a lip 89 and cut-out 90. The lip 89 is relatively flexible and is designed to releasably engage over the screw cover 68b when the locking sleeve is in the locked position (FIGS. 4-6).

As shown in FIG. 6, in the locked position centerlines CL1, CL2 and CL3 are out of alignment. The difference between CL1 and CL2, represented by D1 in FIG. 6, represents the interference fit between the hubs 70a, 70b and outer bore portions 83, 85 of the locking sleeve when the sleeve is locked.

Figure 7:
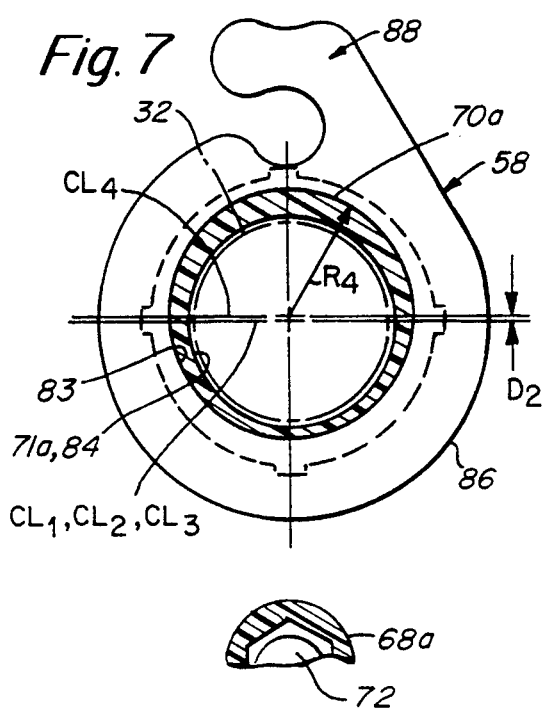
FIG. 7 is a sectional view showing the locking member in the open position.

In contrast, FIG. 7 shows that centerlines CL1, CL2 and CL3 are aligned when the locking sleeve is in the open position. In this case, there is a difference between that common centerline and CL4, represented by distance D2 in FIG. 7, which represents the difference in the centerline of the arm hubs 70a, 70b going from the top to the bottom of the hub (180°). Distances D1, D2 are equal and represent the clearance between the sleeve and carrier arm 32 when the sleeve is unlocked.

A cylindrical foam cushion 56 is provided on the outside of locking sleeve 58. The cushion has an inner bore 57 of a diameter slightly less than the outer diameter of the locking sleeve so as to be friction fit onto the sleeve. Sleeve 58 also has outer ridges 91 extending between arms 62a and 62b to further secure cusion 56 onto sleeve 58. The outer surface of the cushion includes a central groove or channel 59 about the entire perimeter which can be rotated to any position and still engage the top tube 27 of the bicycle frame. The outer and larger diameter end portions 61a and 61b of the cushion straddle the reduced diameter groove 59.

In operation, the support arm 32 of the carrier is slid through the upper bore 51 while the locking sleeve 58 is open, and the foam cushion 56 surrounding the sleeve is turned 180° to securely lock the device 50 onto the support arm, wherein the engagement of locking tab 88 onto screw cover 68 indicates to the user that the sleeve is locked into position (FIG. 6). Alternatively, the device 50 is easily released from the support arm by rotating the cushion 180° in order to reposition the device 50 on the support arm or remove it therefrom (FIG. 7).

Figure 8:
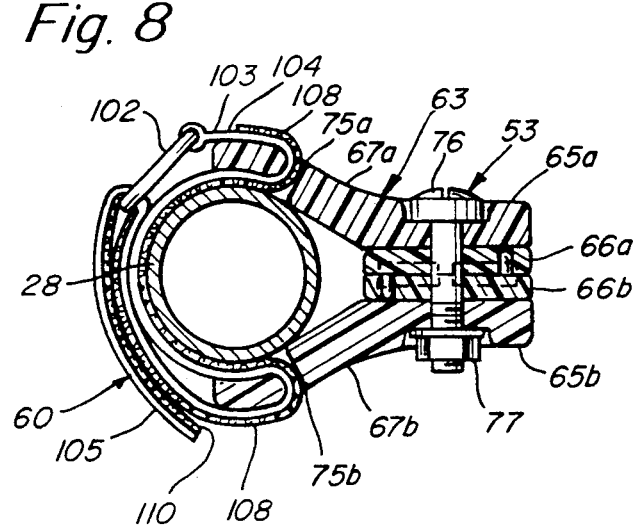
FIG. 8 is a cross-sectional view taken along section lines 8—8 in FIG. 2 showing the lower portion of the locking member engaging the seat tube.
Figure 9:
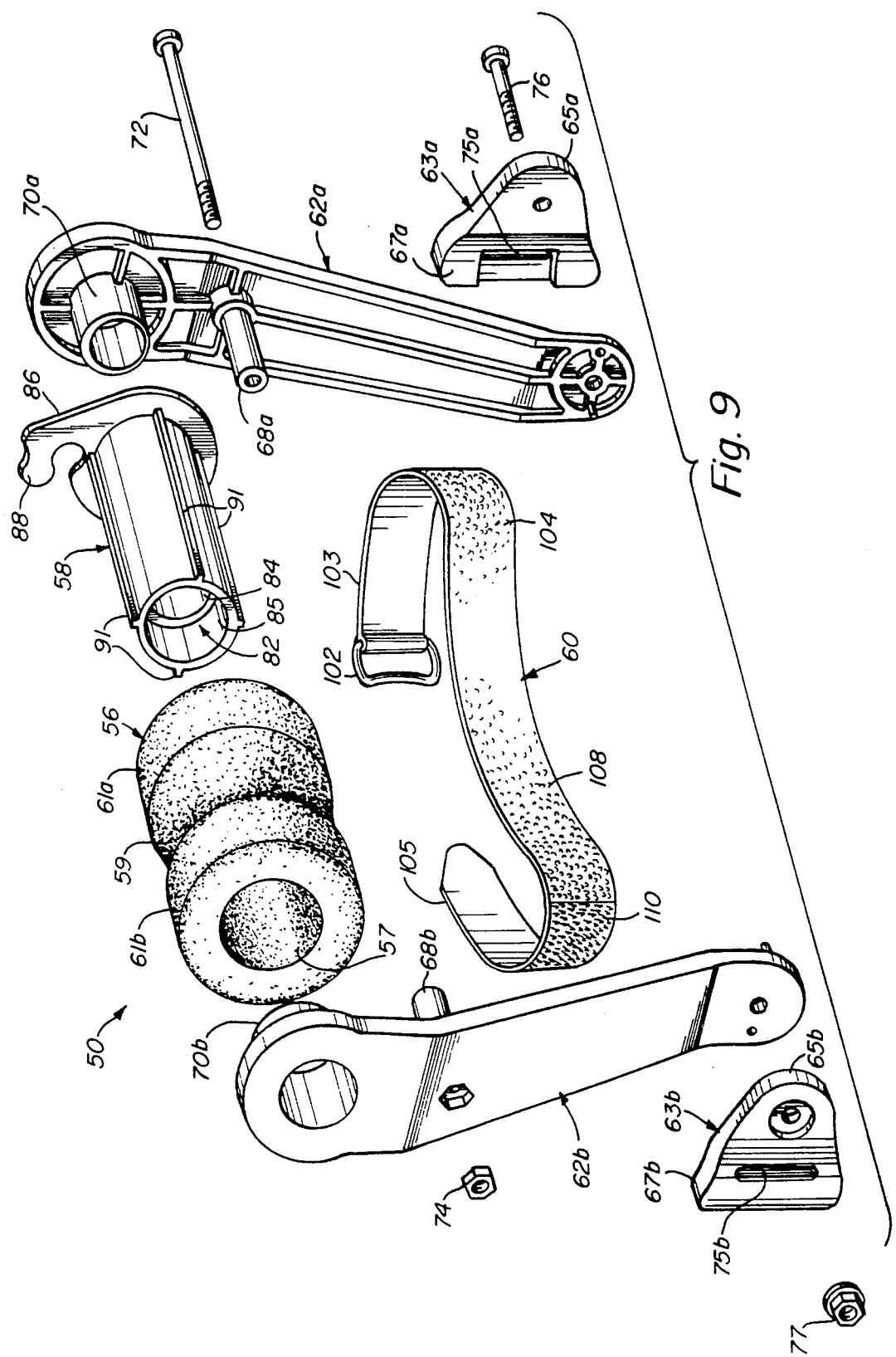
FIG. 9 is an exploded parts view showing the various parts of the locking member of this invention.

At the lower ends 66a, 66b of the first rigid member 62 there is provided a screw 76 which passes through aligned bores 67a and 67b in the first member and commonly aligned bores 73a and 73b in the second rigid member 63 for pivotally securing together the first and second members 62, 63 (FIGS. 4, 8). A nut 77 is provided at the end of screw 76. The second member includes a pair of substantially mirror-image arms 63a, 63b having first ends 65a, 65b adjacent to the first member and opposing spaced second ends 67a, 67b for engaging the seat or down tube of the bicycle frame. The second ends have curved inner surfaces for engaging the down or seat tube of the frame and aligned slots 75a, 75b through which strap 60 passes in order to secure the second member to the seat or down tube (FIG. 8). The strap includes a buckle 102 at a first end 103. The strap has an upper surface 104 having Velcro-type loops 108 adjacent the first end 103 and Velcro-type hooks 110 at an opposing end 105. The strap passes through the slots 75a, 75b and around the seat or down tube, and the distal end 105 is passed back through the buckle 102 and folded back onto itself so that the hooks 110 engage the loops 108. Thus, the second member 63 is quickly and easily attached to the down or seat tube by the strap 60. Further, by varying the angular relationship between the first and second members 61, 63 at the pivot 53 the respective members can be quickly and easily moved into the optimum position for engaging the respective tubes of the bicycle frame.

The first and second members 62, 63 and locking sleeve 58 are made of any sufficiently rigid material, and preferably are molded plastic. First member 62 may be made of a high impact plastic such as polypropylene or nylon, and have reinforcing ribs provided in the molded sections to increase their strength and durability. The second member 63 should be made of a softer thermoplastic rubber which conforms and sticks to the seat or down tube of the bicycle to further secure the attachment. The straps 60 may be made of nylon webbing, while the foam cushion 56 should be an abrasion-resistant material such as a PVC foam.

It should be understood that various changes and modifications of the embodiment shown in the drawings may be made within the scope of this invention. Thus, it is intended that all matter contained in the above description or shown in the accompanying drawings shall be interpreted in an illustrative and not a limiting sense.

What is claimed is:

1. A locking member for releasably securing a bicycle to a carrier, the carrier having a support arm on which the bicycle is mounted and the bicycle having a triangular frame including a top tube, seat tube and down tube, wherein the locking member comprises:
    a first rigid member having on one end thereof a hub with a bore for engaging a support arm on the carrier, and an outer eccentric member on the hub having a centerline offset from the centerline of the support arm, and a locking sleeve for supporting a top tube of a bicycle and which is rotatably mounted on the eccentric member for releasably locking the sleeve to the support arm, wherein the locking sleeve is rotatable between a first position in which it slidably engages the support arm and a second position in which it is locked onto the support arm, and
    a second rigid member pivotally attached to the other end of the first member and having means for releasably engaging a seat or down tube of a bicycle,
    wherein the angular relationship between the first and second rigid members may be varied to enable the first member to engage both the support arm and top tube while the second member engages either the seat tube or down tube of the frame in order to hold the bicycle securely in position on the carrier.

2. The locking member of claim 1, wherein the locking sleeve has an eccentrically mounted central bore offset from the centerline of the support arm for releasably engaging the support arm.

3. The locking member of claim 1, wherein a channel is provided on the outer surface of the locking sleeve for supporting the top tube of the bicycle.

4. The locking member of claim 1, wherein the locking sleeve includes a cushion on its outer surface.

5. The locking member of claim 4, wherein a channel is provided in the cushion for supporting for the top tube of the bicycle.

6. The locking member of claim 1, wherein the locking sleeve further includes means for indicating whether the sleeve is locked to the support arm.

7. The locking member of claim 6, wherein the indicating means comprises a locking tab on the sleeve.

8. The locking member of claim 1, wherein the tube engaging means includes a pair of arms shaped to engage a seat or down tube.

9. The locking member of claim 8, wherein the tube engaging means further includes a strap for engaging a seat or down tube.

10. A locking member for releasably securing a bicycle to a carrier, the carrier having a support arm on which the bicycle is mounted and the bicycle having a triangular frame including a top tube, seat tube and down tube, wherein the locking member comprises:
    a first rigid member having means for supporting a top tube of a bicycle and a locking sleeve with a central bore adapted to move between a first position in which it slidably engages a support arm on the carrier and a second position in which it is releasably locked onto the support arm, and
    a second rigid member pivotally attached to the first member and having means for releasably engaging a seat or down tube of a bicycle,
    wherein the first rigid member comprises a pair of first arms having first ends between which the locking sleeve is provided and second ends pivotally attached to the second rigid member, and the second rigid member has a first end at which the tube engaging means is provided and a second end pivotally connected to the first rigid member, and
    wherein the angular relationship between the first and second rigid members may be varied to enable the first member to engage both the support arm and top tube while the second member engages either the seat tube or down tube of the frame in order to hold the bicycle securely in position on the carrier.

11. An improved carrier for mounting a bicycle on a motor vehicle, the carrier having a frame adapted to be mounted on the vehicle and a support arm attached to the frame on which the bicycle is mounted, the bicycle having a triangular frame including a top tube, seat tube and down tube, the improvement comprising:

a locking member for releasably securing a bicycle to the carrier, the locking member comprising a first rigid member pivotally attached to a second rigid member, the first rigid member having a locking sleeve for supporting a top tube of a bicycle, a pair of first arms having first ends between which the locking sleeve is eccentrically mounted, wherein the locking sleeve is provided with a central bore adapted to move between a first position in which it slidably engages a support arm of the frame and a second position in which it is releasably locked onto the support arm, and the second rigid member having a first end at which a tube engaging means is provided for releasably engaging a seat or down tube of a bicycle, and a second end pivotally connected to a second end of the first rigid member, wherein the angular relationship between the first and second rigid members may be varied to enable the first member to engage both the support arm and top tube while the second member engages either the seat tube or down tube of the frame in order to hold the bicycle securely in position on the carrier.

12. The carrier of claim 11, including two locking members, one for engaging a seat tube and one for engaging a down tube.

13. The carrier of claim 11, wherein the locking member is positioned to engage a seat tube.

14. The carrier of claim 11, further comprising an elastic tie cord attached to the support arm for further securing the top tube to the locking member.

* * * * *